United States Patent
Laursen

(10) Patent No.: US 7,131,651 B2
(45) Date of Patent: Nov. 7, 2006

(54) CHASSIS WITH HEIGHT ADJUSTABLE WHEELS FOR REGULATING ORIENTATION OF A CHASSIS MEMBER

(76) Inventor: Niels Kjaer Laursen, Tonningvej 16, Braedstrup (DK) DK-8740

(*) Notice: Subject to any disclaimer, the term of this patent is extended or adjusted under 35 U.S.C. 154(b) by 249 days.

(21) Appl. No.: 10/468,812

(22) PCT Filed: Feb. 22, 2002

(86) PCT No.: PCT/DK02/00119

§ 371 (c)(1), (2), (4) Date: Aug. 22, 2003

(87) PCT Pub. No.: WO02/070323

PCT Pub. Date: Sep. 12, 2002

(65) Prior Publication Data

US 2004/0066010 A1    Apr. 8, 2004

(30) Foreign Application Priority Data

Feb. 22, 2001 (DK) .............................. 2001 00291

(51) Int. Cl.
*B60G 17/00* (2006.01)

(52) U.S. Cl. ............... 280/6.154; 180/9.52; 180/900; 280/6.155; 280/124.111; 280/124.112; 280/124.116; 280/104

(58) Field of Classification Search ............. 280/6.156, 280/6.155, 6.154, 104, 788, 124.111, 124.112, 280/124.113, 124.116, 124.128; 180/900, 180/906, 9.52
See application file for complete search history.

(56) References Cited

U.S. PATENT DOCUMENTS

| | | | | |
|---|---|---|---|---|
| 1,686,941 A | * | 10/1928 | Taylor | 280/6.154 |
| 2,829,901 A | * | 4/1958 | Rush | 280/43.18 |
| 2,954,833 A | * | 10/1960 | Davidson | 180/9.52 |
| 3,309,097 A | * | 3/1967 | Seeber | 280/6.154 |
| 3,899,037 A | | 8/1975 | Yuker | |
| 4,186,815 A | | 2/1980 | Hart | |
| 4,679,803 A | * | 7/1987 | Biller et al. | 280/6.154 |
| 5,967,529 A | * | 10/1999 | Kopczynsk | 280/6.155 |
| 6,131,919 A | | 10/2000 | Lee et al. | |

FOREIGN PATENT DOCUMENTS

EP    0501585 A1  *  9/1992

(Continued)

*Primary Examiner*—Eric Culbreth
(74) *Attorney, Agent, or Firm*—James Creighton Wray

(57) ABSTRACT

A chassis is described which is constructed of two lower side frames which at each end are provided with a wheel or caterpillar track. On each of the two lower side members, there is a horizontal bearing. Each of these bearings are connected to an upper vertical side member which at their upper end is connected to two parallel cross members through horizontal bearings for the development of a parallelogram connection. Between the lower and upper side members, there are two double-acting hydraulic cylinders. These can be connected in parallel in order to make a weight distribution possible. By means of a regulation valve between pressure side and suction side, respectively, on the double-acting hydraulic cylinders the upper part of the chassis can swing back and forth in the longitudinal direction of the side members. Between the two cross members there is a double-acting hydraulic cylinder which can swing the upper part of the chassis back and forth in the side member's transverse direction by means of a regulation valve. Thus, it is possible to adjust a chassis member to a preferred orientation irrespective of the slope of the surface.

13 Claims, 5 Drawing Sheets

FOREIGN PATENT DOCUMENTS

| | | |
|---|---|---|
| EP | 1114577 | 7/2001 |
| FR | 2719543 | 11/1995 |
| SE | 459571 | 7/1989 |
| WO | WO 91/14590 | 10/1991 |

\* cited by examiner

CHASSIS WITH HEIGHT ADJUSTABLE WHEELS FOR REGULATING ORIENTATION OF A CHASSIS MEMBER

This application claims the benefit of Danish Application No. PA 2001 00291 filed Feb. 22, 2001 and PCT/DK02/00119 filed Feb. 22, 2002.

BACKGROUND OF THE INVENTION

The present invention relates to a chassis with four supporting wheels or more, and with means for height adjustment of these in order to provide adjustment of the orientation of a chassis member in relation to a reference orientation, preferably vertically. Such a chassis is preferably applicable for a portal tractor, but is also applicable in other cross-country vehicles, where it is preferred to maintain a given orientation of chassis, irrespective of roughness or slope in the ground and where a four-point distribution is desired as well. Portal tractors, which are built up as three-wheeled vehicles with stationary members so they follow the slope of the ground, are known. These are intended to be used with row crops with growth in the shape of trees and bushes. Such crops will grow vertically irrespective of slope of the ground. When the known portal tractors are used on sloping ground, they will run against trees as these grow vertically. The three-wheeled construction makes it difficult to drive on the ground, as the centre of gravity must be kept within the triangle of the three wheels; also, optimal working conditions are not present between a tractor driving on sloping ground and trees or other growths growing vertically.

A chassis, with a construction where the wheels are individually adjustable, is also known. These are, however, technically complicated and expensive constructions.

It is the purpose of the present invention to show a chassis of the type mentioned in the beginning, which makes it possible to swing an upper part of the chassis sideways as well as back and forth in the direction of travel for a vehicle, for example a portal tractor, in such a way that a chassis member, for example a portal for supporting tools, can be adjusted to a preferred orientation, preferably vertically, and which at the same time makes a weight distribution on the wheels of the vehicle possible.

According to the present invention this is obtained with a chassis which is peculiar in that it includes two lower side members which at each end are equipped with one or more wheels or caterpillar tracks, that each lower side member between its front end and rear end includes a first bearing with an axis of rotation substantially transversely of the longitudinal direction of the lower side member, that an upper side member is connected to each of these first bearings, and that each upper side member includes two other bearings at an upper part thereof at different distances from the lower side member and with axes of rotation oriented in the longitudinal direction of the lower side members, and that two parallel cross members are connected in pairs to these other bearings for forming a parallelogram connection between the upper side members and the cross members.

A chassis according to the invention, for example for a cross-country portal tractor, can be provided with four driving and/or steering wheels or caterpillar track. The chassis is built up so there is a lower side member between a front wheel and a rear wheel or caterpillar track, and there is such a lower side member at each side of the vehicle. It is most common that the wheels are oriented for driving in the longitudinal direction of the side members; but it is possible to have the wheels oriented for driving transversely to the lower longitudinal direction of the side members.

On the side member there is a horizontal bearing with the axis transversely to the direction of travel, at this bearing an upper side member is mounted, which preferably is a vertical member forming one side of the portal. This makes swinging back and forth in the direction of travel possible.

At the top in the upper side member there are two bearings, which preferably are horizontal bearings with their axis of rotation oriented in the longitudinal direction of the lower side member, i.e. with an orientation longitudinally of the direction of travel.

The opposite side of the chassis is built up in the same way, with lower side member and upper side member, and at an upper part of the upper side members two cross members are disposed, forming a bottom and a top in an articulated parallelogram. The two bearings at the top at each of the upper side members create corners in the articulated parallelogram formed between the upper side members and the cross members. This makes swinging back and forth transversely to direction of driving possible.

According to the invention, a portal tractor with a chassis may advantageously be used for maintenance of Christmas trees and other row cultures on even or broken ground as well as uneven area where other portal tractors cannot run.

A portal tractor according to the invention with a four-point chassis is advantageous by having four-point weight distribution and a regulation of the tilting of the portal in a construction with a technically simple construction based on application of two mutually connected side members, instead of an independent and individual suspension and regulation of each wheel.

The centre of gravity is not so difficult to keep within the four wheels. By means of the structuring of the portal's points of support and the way in which longitudinally adjustable mechanisms, preferably in the shape of hydraulic cylinders, are mounted, it is possible to distribute the weight of the machine on to all four wheels.

If, for example, the right front wheel travels down into a hollow, then the difference between the right side member and the left side member will be distributed with half the deflection of the portal member through the connected hydraulic cylinders.

Portal tractors can be tilted sideways and back and forth in relation to side members/direction of travel. This makes it possible to adjust the portal on the tractor, so it is always vertical. On the portal member tool for the maintenance of for example Christmas trees and other row cultures can be mounted, which creates optimal working conditions for vertical working devices for vertical trees.

According to a specific embodiment, the chassis according to the invention is peculiar in that between a third bearing on a lower cross member and a fourth bearing on an upper cross member, a first longitudinally adjustable mechanism is arranged for extending or reducing the distance between the third and fourth bearing.

According to a further embodiment, the chassis is peculiar in that between a fifth bearing on a lower side member and a sixth bearing on an upper side member, another longitudinally adjustable mechanism is arranged that can extend or reduce the distance between the fifth and sixth bearing. This is particularly anticipated that a double-acting hydraulic cylinder is provided between each lower side member and corresponding upper side member.

With these embodiments it becomes possible to regulate the inclination of a chassis member in a sideways direction and in longitudinal direction, respectively, by extending or shortening it or the relevant mechanisms. This may occur as a result of a signal, for example from an electronic control signal which receives a reference signal from an electronic level, whereby the arrangement of the wheels on a sloping or uneven ground is detected.

According to a further embodiment, the chassis is peculiar in that the two cross members include a seventh bearing and an eighth bearing, respectively, each with an axis of rotation oriented in the longitudinal direction of the lower side members, that between these a central member is arranged; that at one of the cross members a further cross member is arranged about a ninth bearing with an axis of rotation oriented in the longitudinal direction of the lower side members, that at the ends of the further cross member there are tenth bearings with an axis of rotation oriented in the longitudinal direction of the lower side members, that each lower side member comprise an eleventh bearing at a distance from the first bearing and with an axis of rotation oriented transversely to the longitudinal direction of the lower side member, and that at each side a connecting bar is arranged between the tenth and eleventh bearing. With this construction it is possible to create a technically simple chassis where the weight distribution is established by the further cross member swinging about the ninth bearing. The central member can be used for carrying tools and/or for carrying a driver's cab for the vehicle.

Hereby, a chassis member, for example the central member or a side member, can be kept in a preferred orientation, for example vertical, simultaneously with a difference of height between the wheel/side members of the portal frame is distributed by a simple swinging movement without the need to use longitudinally adjustable mechanisms between lower and upper side members.

If the connecting rods are longitudinally adjustable mechanisms that can extend or reduce the distance between the tenth and eleventh bearing, it is possible to regulate the inclination of the chassis member in longitudinal direction by extending or shortening the mechanism.

The shape of a chassis according to the invention is flexible, as it is anticipated that the longitudinally adjustable mechanisms are selected among hydraulic, mechanic, electrically activating actuators, for example single- or double-acting hydraulic cylinders, racks or electrical linear actuators. According to the invention, a chassis can hereby be established for vehicles irrespective of whether these are electrically driven or driven by an internal combustion engine as power source in order to power a hydraulic pump. Thus, it is anticipated that the height adjustment means include a power source such as hydraulic pump, electric motor or the like as well as means for adjusting the orientation of the chassis member and which is connected to a power source in order to activate it for establishing a preferred orientation of the chassis member.

Alternatively, it is possible to use a pneumatic cylinder as longitudinally adjustable mechanisms even though it is preferred to use mechanisms with the possibility of a stationary longitudinal adjustment.

According to a further embodiment, the chassis is peculiar in that in a supply circuit to the hydraulic cylinders, there is inserted a regulating valve or a mechanism with the same function which by means of control signals from the height adjustment means can extend or shorten the hydraulic cylinders. Hereby, it is possible to establish the preferred displacements of the mutual chassis members by means of a control signal, preferably electronic, for setting of the valves, so the preferred extensions/reductions of the used hydraulic cylinders are obtained.

According to the invention, the chassis can have different shapes depending on the application intended. For use as a portal tractor it is anticipated that it forms a largely U-shaped, L-shaped or H-shaped portal for supporting the processing tools in a chassis member for treating vertically oriented crops irrespective of slope of the ground where the crops grow.

Alternatively, the chassis can be used in other vehicles as for example combined harvesters, tractors or contracting machines where it is preferred to maintain part of the vehicle or the chassis in a desired well-defined orientation irrespective of the character or slope of the ground.

In the following, the invention will be explained in more detail with reference to the schematic drawing enclosed, where:

DETAILED DESCRIPTION OF THE PREFERRED EMBODIMENTS

Figure 1:
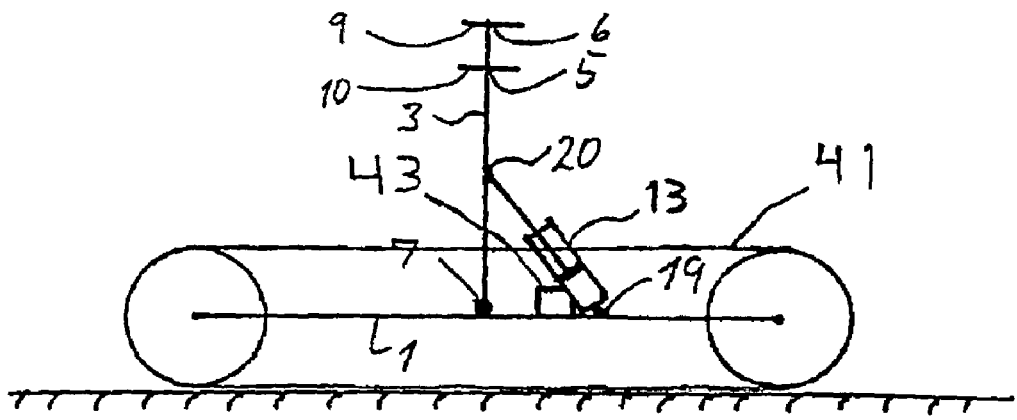
FIG. 1 shows a first embodiment of a chassis seen from the side on horizontal ground.

In FIG. 1 to FIG. 7, a first embodiment is shown for a chassis in schematic drafts, where some components such as motor, control system and mountings for tools are omitted. According to the invention, only the essential elements which are necessary for the understanding of the fundamental structure are illustrated.

The chassis is constructed with four-point weight distribution and tilt control. It is constructed with two lower side members 1, 2 which at each end are supplied with supports in the shape of wheels, which can be steering/driving wheels. Alternatively, single wheels, or boogie wheels, or caterpillar tracks 41 can be used. Between the two ends of each of the two side members, the first horizontal bearing is 7, 8 with an axis of rotation oriented transversely to the longitudinal direction of the side members, which is placed in the plane of the paper in FIG. 1 to FIG. 3.

To each of these first bearings 7,8 a vertical upper side member 3,4 is connected. At an upper end of these upper side members 3,4 two parallel cross members 5,6 are mounted 5,6. These are connected through other horizontal and longitudinal bearings 9,10 and 11,12, respectively. Between the two cross members 5,6 a first longitudinally adjustable mechanism in the shape of a double-acting hydraulic cylinder 13 is arranged. A power source 43 is schematically shown for establishing a preferred orientation of the chassis member. This one is suspended in a third bearing 17 on the lower cross member 5, and a fourth bearing 18 on the upper cross member 6 and can extend or reduce the distance between these two bearings 17, 18 by means of a regulating mechanism (not shown).

Between each lower side member 1,2, and the corresponding vertical upper side member 3,4 another longitudinally adjustable mechanism in the shape of a double-acting hydraulic cylinder 14, 15 is disposed. By means of a regulating mechanism (not shown), the latter can extend or reduce the distance between a fifth bearing 19,21 on the lower side member and a sixth bearing 20,22 on the upper side member 3,4.

Figure 6:
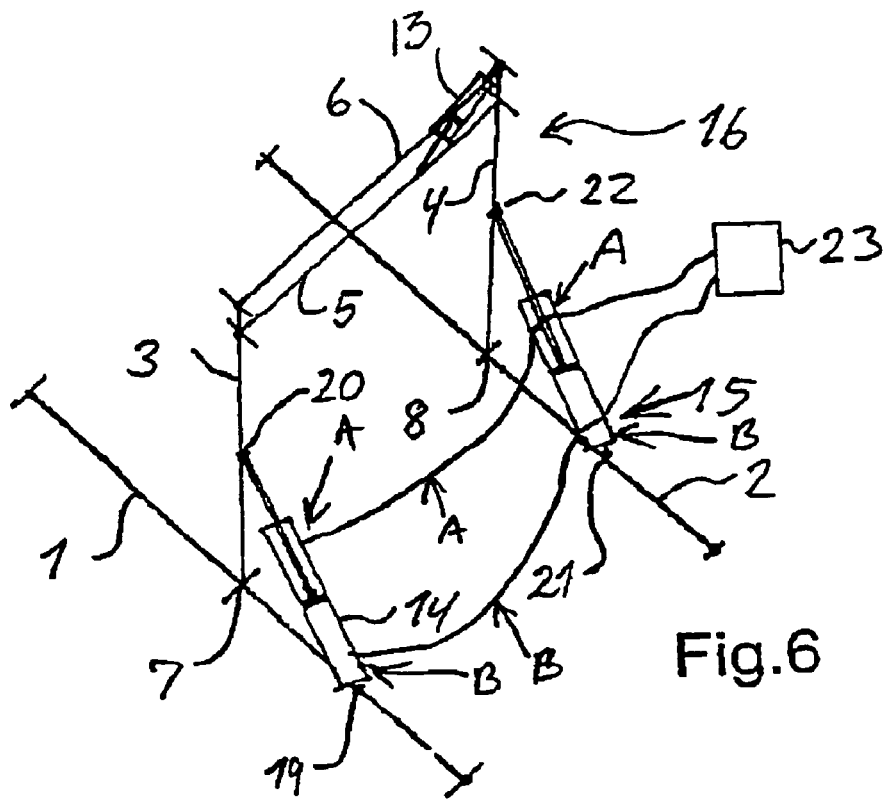
FIG. 6 shows the chassis shown in FIG. 1, seen obliquely from the side.

The two hydraulic cylinders 14,15 may, as shown in FIG. 6, be interconnected as communicating vessels in such a way that the A sides of the cylinders 14,15 are connected and the B sides are also connected. Between the A sides and the B sides is inserted a regulation valve 23 or a mechanism with the same function, whereby it is possible to extend or reduce the distance between the two bearings 19,21 and 20,22 on the lower and upper side members.

Figure 2:
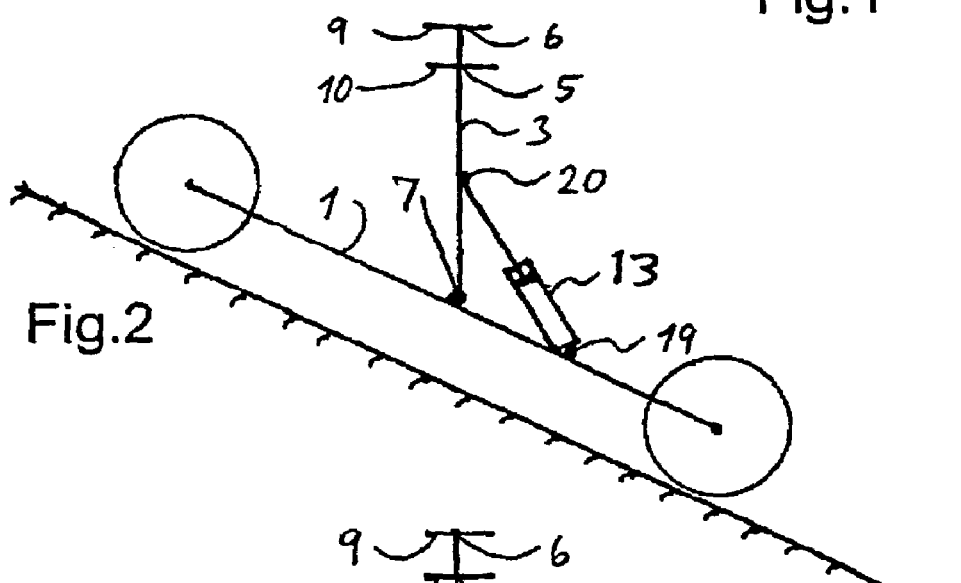
FIG. 2 shows the chassis shown in FIG. 1, seen from the side on rising ground.
Figure 3:
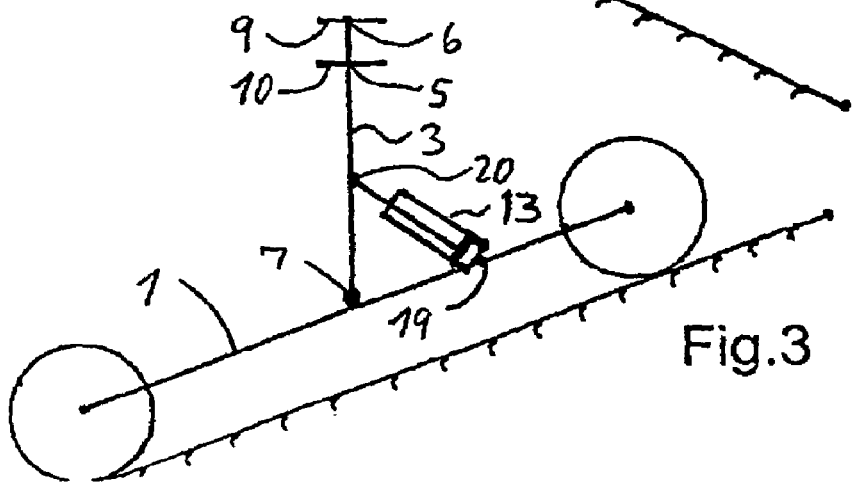
FIG. 3 shows the chassis shown in FIG. 1, seen from the side on falling ground.
Figure 4:
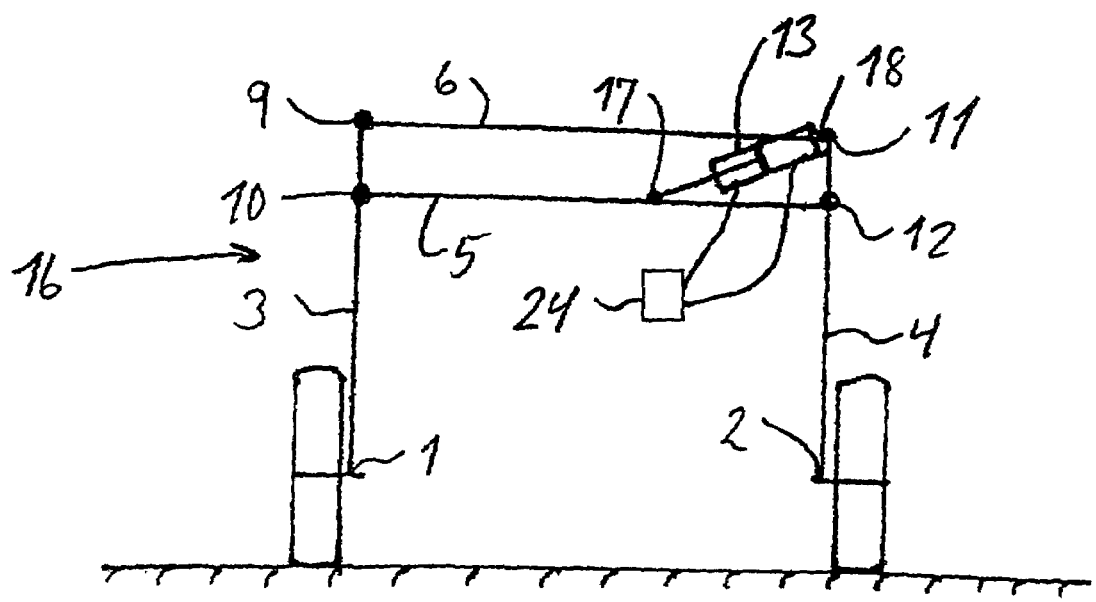
FIG. 4 shows the chassis shown in FIG. 1, seen from the end on horizontal ground.

A portal member 16 is formed by the upper side members and the cross members, and this one can be swung back and forth. This happens by activating the regulation valve 23 inserted on the hydraulic cylinders 14,15 between the A sides and the B sides, so that the portal member 16 is displaced back and forth about the first bearings 7,8 as illustrated in FIGS. 2 and 3.

Figure 5:
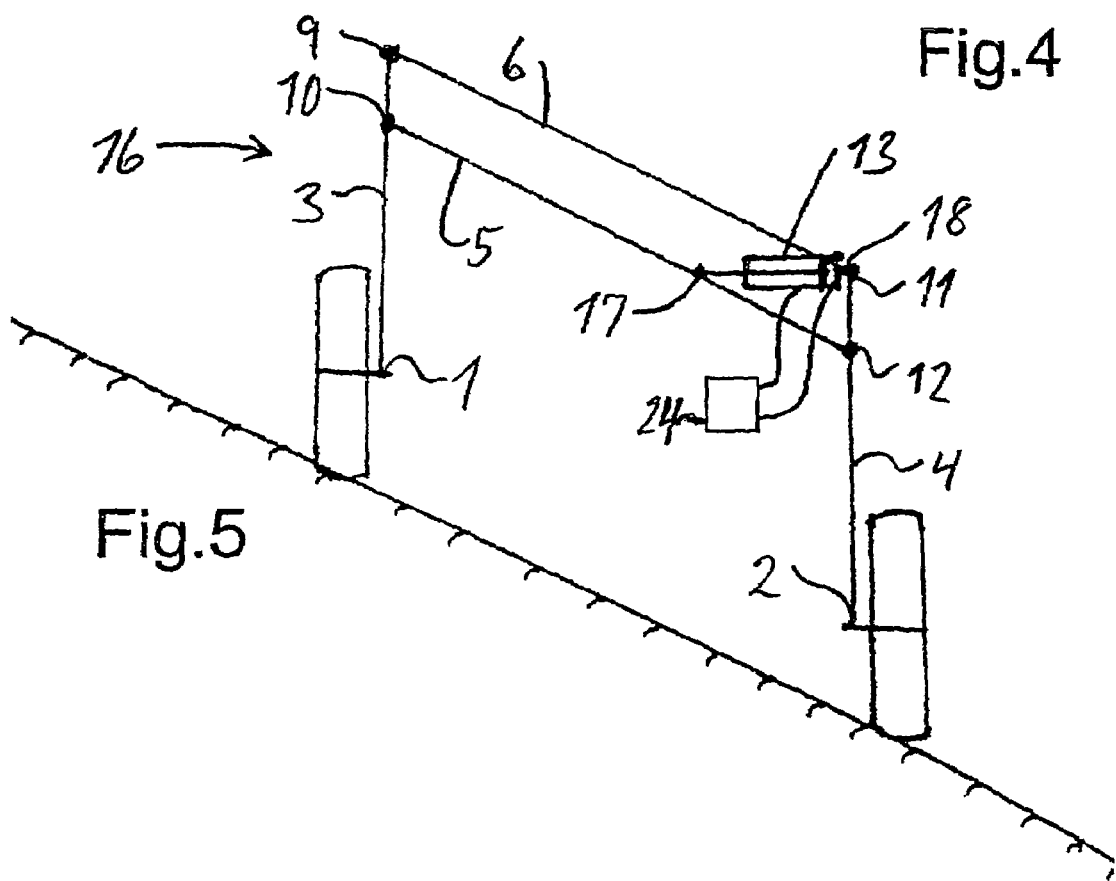
FIG. 5 shows the chassis shown in FIG. 1, seen from the end on sloping ground.

The portal member 16 can be swung back and forth in transverse direction in relation to the longitudinal direction of the chassis. This happens by a parallelogram being formed, consisting of the uppermost parts of the upper side members 3,4 and the two cross members 5,6. The double-acting hydraulic cylinder 13 suspended between the two cross members is connected with a regulating valve 24 or a mechanism with the same function. By activating the regulation valve 24 by means of a regulation mechanism (not shown), it is possible to extend or reduce the distance between the two bearings 17,18 and thereby bring about an tilting as illustrated in FIG. 5.

Figure 7:
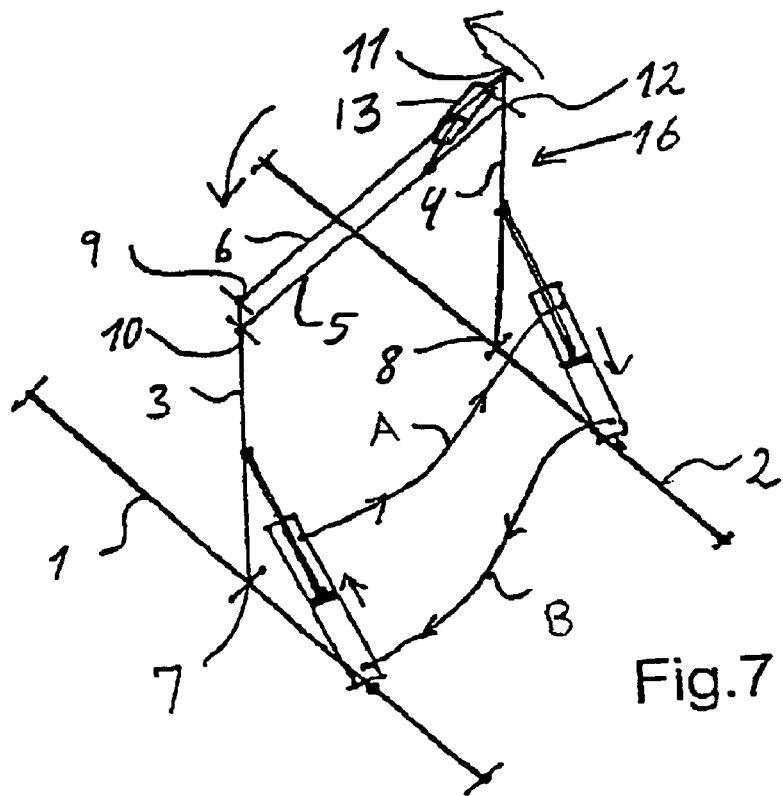
FIG. 7 shows the chassis shown in FIG. 1, seen obliquely from the side, on uneven ground.
Figure 8:
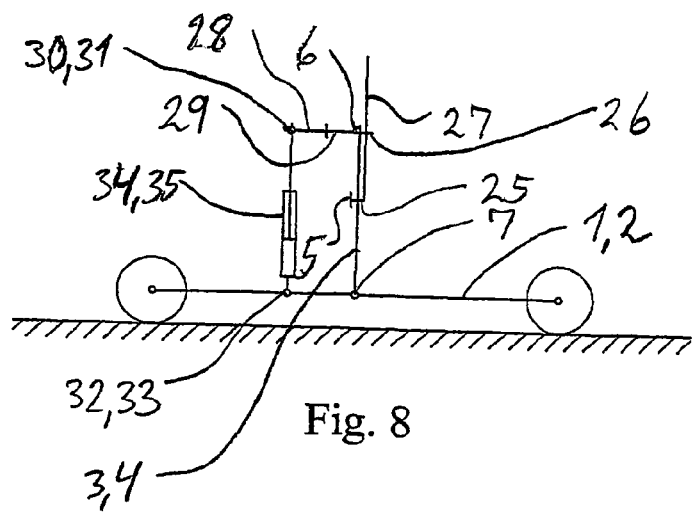
FIG. 8 shows a further embodiment of a chassis as seen tilted from the side on a horizontal ground.
Figure 9:
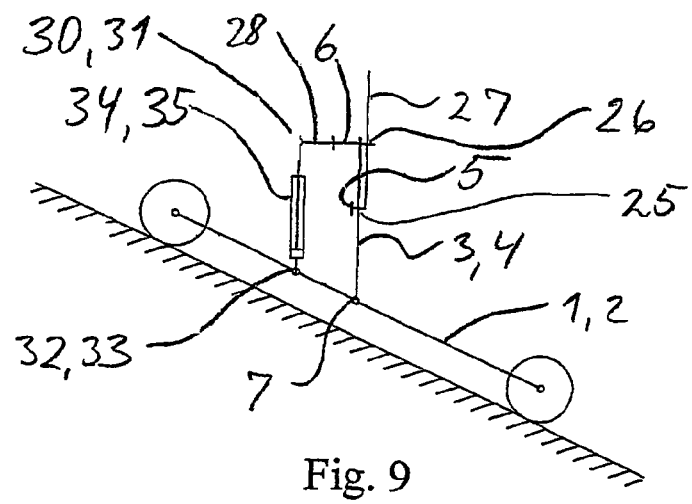
FIG. 9 shows the chassis shown in FIG. 8, seen from the side on rising ground.
Figure 10:
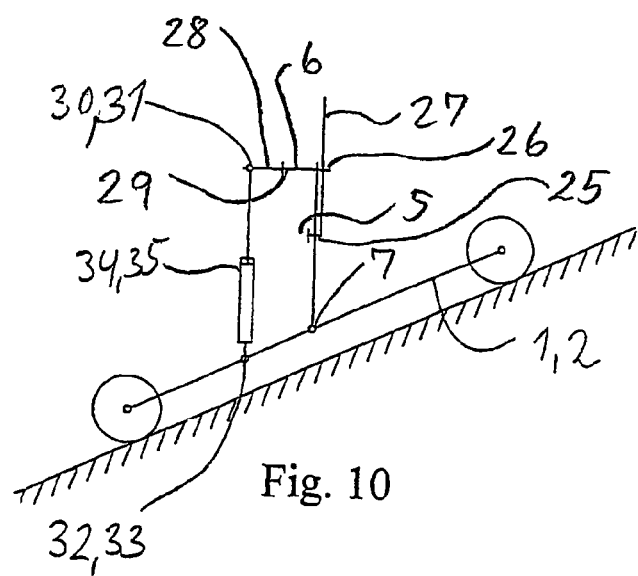
FIG. 10 shows the chassis shown in FIG. 8, seen from the side on falling ground.
Figure 11:
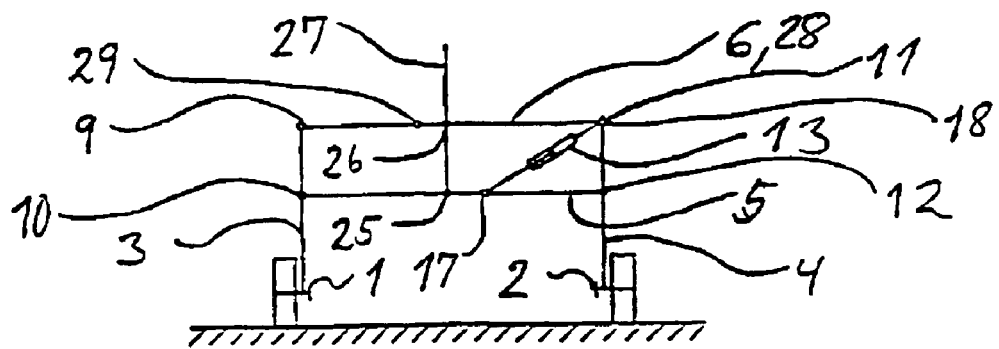
FIG. 11 shows the chassis shown in FIG. 8, seen from the end on a horizontal ground.
Figure 12:
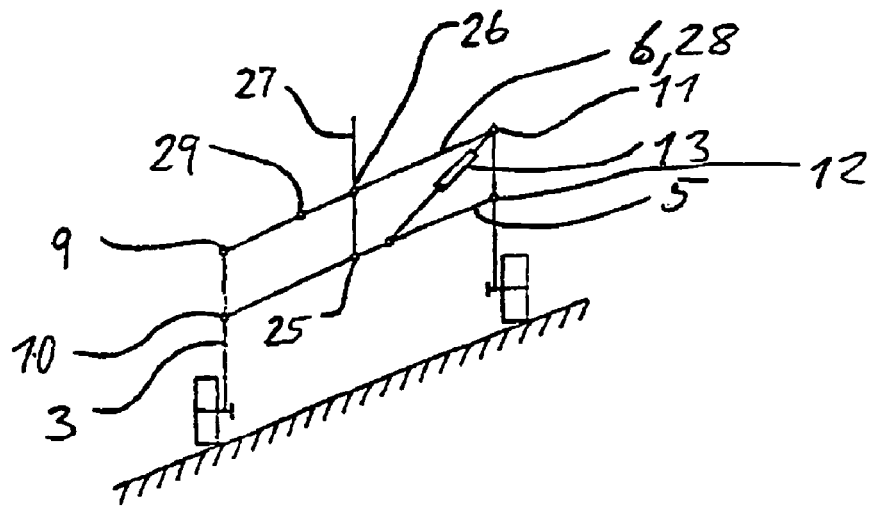
FIG. 12 shows the chassis shown in FIG. 8, seen from the end on a falling ground.
Figure 13:
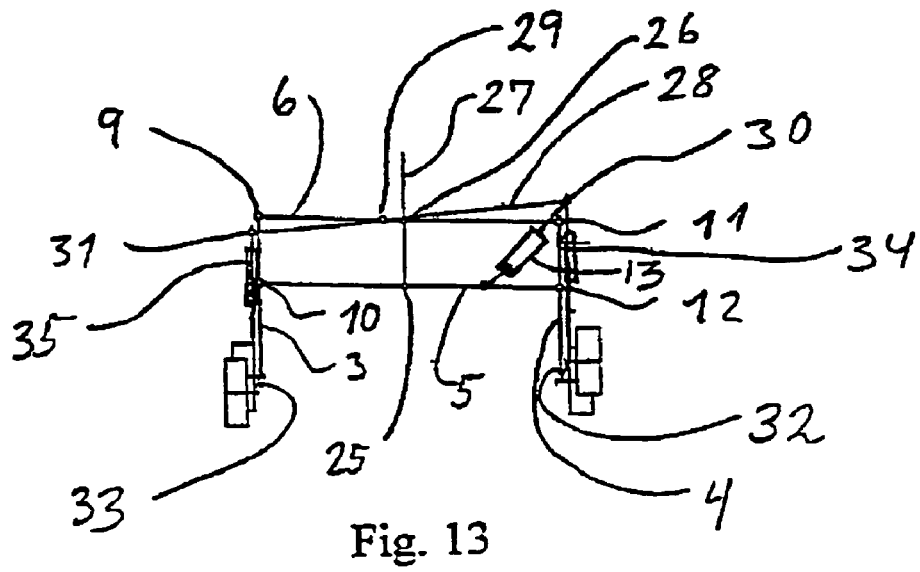
FIG. 13 shows the chassis shown in FIG. 8, seen from the end on an uneven ground.

The construction, where the hydraulic cylinders between the lower and upper side members 1,2 as well as 3,4 have connected side A on the hydraulic cylinder 14 with side A on the hydraulic cylinder 15, and side B on the hydraulic cylinder 14 with side B on the hydraulic cylinder 15, has the effect that the weight of the vehicle will be distributed between the four wheels at the ends of the two lower side members 1,2. This effect is illustrated in FIG. 7.

In FIG. 8 to FIG. 13, another embodiment for a chassis is shown in schematic drafts, where some components are also omitted, so that only the basic components necessary for the understanding of the fundamental construction according to the invention are illustrated.

This embodiment differs from the first embodiment in that the two cross members 5,6 comprise a seventh respectively eighth horizontal bearing 25, 26 and that a central member 27 is suspended in those two bearings. Furthermore, a further cross member 28 is suspended about a ninth horizontal bearing 29 on one of the cross members 6.

At each end of the further cross member 28, there are tenth horizontal bearings 30,31 oriented in the longitudinal direction of the chassis. In each lower side member 1,2 there are eleventh horizontal bearings 32,33 oriented transversely to the longitudinal direction of the chassis. Between the tenth and eleventh bearings a connecting rod 34,35 is arranged, which in the embodiment shown comprises a hydraulic cylinder (omitted in FIGS. 11–13 for the sake of clarity). Alternatively, this could be a rod with a fixed length. In the figures, the cross member 6 and the further cross member 28 are shown with a certain length away from the upper side members 3,4. Alternatively, these can be constituted by quite small beams, so that a triangle is largely formed by the connecting rod 34,35, the lower part of the upper side members 3,4 and the part of the lower side members 1,2 extending between the bearings 7 and 32,33.

This second embodiment works in the same way as explained above. However, with this embodiment a weight distribution by the swinging of the further cross member 28 about the ninth bearing 29 will be achieved.

The invention claimed is:

1. A chassis with plural supporting wheels adjustable disposed for adjusting orientations of a chassis member relative to a reference orientation, comprising two lower side members, each lower side member having a pair of ends, each end of each of the two lower side members having one or more wheels or caterpillar tracks, a pair of first couplings on the two lower side members, the first couplings being disposed between front ends and rear ends of the two lower side members, the first couplings rotatable about an axis of rotation substantially transversely of a longitudinal direction of each respective lower side member, two upper side members connected to the first couplings, a pair of second couplings on each upper side member disposed at upper parts of the upper side members spaced from the lower side members, the second couplings rotatable about axes of rotation oriented in the longitudinal direction of the lower side members, and two parallel cross members coupled to the pairs of second couplings forming a parallelogram connection between the upper side members and the two cross members.

2. The chassis of claim 1, further comprising a third coupling on one cross member and a fourth coupling on another cross member, and a first longitudinally adjustable mechanism disposed between the third coupling and the fourth coupling for extending or reducing distances between the third and the fourth couplings.

3. The chassis of claim 2, further comprising a fifth coupling on one lower side member and a sixth coupling on one upper side member, and a second longitudinally adjustable mechanism disposed between the fifth and the sixth couplings for extending or reducing distances between the fifth and the sixth couplings.

4. The chassis of claim 1, further comprising a seventh coupling and an eighth coupling on each cross member, respectively, each of the seventh and the eight couplings rotatable about an axis of rotation oriented in the longitudinal direction of the lower side members.

5. The chassis of claim 4, further comprising a central member disposed between the seventh and the eighth couplings.

6. The chassis of claim 4, further comprising a third cross member and a ninth coupling coupled to the third cross member, the ninth coupling rotatable about an axis of rotation oriented in the longitudinal direction of the lower side members, and tenth couplings at ends of the third cross member rotatable about an axis off rotation oriented in the longitudinal direction of the lower side members.

7. The chassis of claim 6, further comprising a eleventh coupling coupled to each lower side member spaced from the first couplings rotatable about an axis of rotation oriented transversely to the longitudinal direction of the lower side member, and connecting bars disposed on each side between the tenth and the eleventh couplings.

8. The chassis of claim 7, wherein the connecting bars are additional longitudinally adjustable mechanisms for extending or reducing distances between the tenth and the eleventh couplings.

9. The chassis of claim 8, wherein the longitudinally adjustable mechanisms are actuators.

10. The chassis of claim 3, further comprising double-acting hydraulic cylinders disposed between each lower side member and each corresponding upper side member.

11. The chassis of claim 1, further comprising a power source for establishing a preferred orientation of the chassis member.

12. The chassis of claim 10, further comprising a supply circuit for the hydraulic cylinders, and a regulation valve in the supply circuit for controlling orientation of the chassis member by extending or reducing the hydraulic cylinders responsive to surfaces supporting the chassis.

13. The chassis of claim 1, wherein the chassis member is shaped for supporting working tools and for working vertically oriented crops irrespective of slopes of surfaces on which the crops grow.

* * * * *